(12) United States Patent
Wallace

(10) Patent No.: US 8,882,345 B2
(45) Date of Patent: Nov. 11, 2014

(54) BREWING APPARATUS AND METHOD

(75) Inventor: Allan K Wallace, Tranmere (AU)

(73) Assignee: Coopers Brewery Limited, South Austrailia (AU)

(*) Notice: Subject to any disclaimer, the term of this patent is extended or adjusted under 35 U.S.C. 154(b) by 1108 days.

(21) Appl. No.: 12/528,157

(22) PCT Filed: Feb. 22, 2008

(86) PCT No.: PCT/AU2008/000238
§ 371 (c)(1),
(2), (4) Date: Feb. 15, 2010

(87) PCT Pub. No.: WO2008/101298
PCT Pub. Date: Aug. 28, 2008

(65) Prior Publication Data
US 2010/0323059 A1    Dec. 23, 2010

(30) Foreign Application Priority Data

Feb. 22, 2007  (AU) .............................. 2007900916

(51) Int. Cl.
| | | |
|---|---|---|
| *G01N 25/00* | (2006.01) |
| *G01K 7/00* | (2006.01) |
| *G01K 3/00* | (2006.01) |
| *G01K 1/14* | (2006.01) |
| *C12C 11/00* | (2006.01) |
| *C12C 13/10* | (2006.01) |

(52) U.S. Cl.
CPC ................................... *C12C 13/10* (2013.01); *C12C 11/006* (2013.01)
USPC ............. 374/45; 374/166; 374/112; 374/141

(58) Field of Classification Search
USPC ..................... 374/45, 166, 112, 141
See application file for complete search history.

(56) References Cited

U.S. PATENT DOCUMENTS

| | | | | |
|---|---|---|---|---|
| 3,713,839 A | * | 1/1973 | Delente et al. ................... | 426/11 |
| 3,814,003 A | * | 6/1974 | Vacano ........................... | 99/276 |
| 4,541,733 A | * | 9/1985 | Andre ............................ | 374/149 |
| 4,652,451 A | * | 3/1987 | Leedham et al. ................ | 426/11 |
| 5,421,247 A | * | 6/1995 | Shim .............................. | 99/468 |

(Continued)

FOREIGN PATENT DOCUMENTS

WO       2003/079826       10/2003

OTHER PUBLICATIONS

Downey, M et al., "Continuous temperature monitoring during red wine fermentation", Australian and New Zealand Wine Industry journal, 2006, vol. 21, 3, pp. 26, 28 and 30.

(Continued)

*Primary Examiner* — Mirellys Jagan
(74) *Attorney, Agent, or Firm* — Greenblum & Bernstein, P.L.C.

(57) ABSTRACT

The specification discloses brewing apparatus and a method for testing for end of fermentation of a fermenting brew. It has been determined that, once fermentation is complete, the temperature of a brew (such as beer) shows a tendency to stratify in horizontal layers. However, the activity of fermentation disrupts the tendency of the brew to stratify. Accordingly, the brewing apparatus comprises at least two temperature sensors positioned to measure a temperature difference between the temperature at a first height of the brew and the temperature at a second height of the brew. End of fermentation is identified if the temperature difference is greater than a threshold difference.

28 Claims, 2 Drawing Sheets

(56) References Cited

U.S. PATENT DOCUMENTS

| | | | | |
|---|---|---|---|---|
| 7,963,213 | B1* | 6/2011 | Murdock | 99/323.1 |
| 2003/0097937 | A1* | 5/2003 | Francia | 99/275 |
| 2003/0219062 | A1* | 11/2003 | Egidio | 374/170 |
| 2005/0077029 | A1* | 4/2005 | Morales Cervantes et al. | 165/90 |
| 2008/0175951 | A1* | 7/2008 | Rule | 426/15 |
| 2009/0028999 | A1* | 1/2009 | Melisch et al. | 426/8 |
| 2010/0129490 | A1* | 5/2010 | Williams et al. | 426/11 |
| 2010/0278980 | A1* | 11/2010 | Tomasello et al. | 426/231 |
| 2011/0250312 | A1* | 10/2011 | Lewis | 426/11 |
| 2012/0070535 | A1* | 3/2012 | Kamil | 426/16 |
| 2012/0189736 | A1* | 7/2012 | Wallace et al. | 426/11 |

OTHER PUBLICATIONS

Schuch, C., "Temperaturverteilung in zylindronischen Tanks. [Temperature distribution in cylindroconical tanks.]", (1996), 136 (13) pp. 594-597 and computer generated English language translation.
Martin, E. C. B.,"Fermentation and maturation of lager", International Bottler and Packer, (1978), 52 (7) 24, 26 and 28, 30-31.
Australian Patent Examination Report No. 1, dated Aug. 15, 2012.
Australian Patent Examination Report No. 2, dated Nov. 13, 2012.
Australian Patent Examination Report No. 3, dated Jul. 26, 2013.
Australian Notice of Acceptance, dated Aug. 29, 2013.
Claims as accepted in Australian Patent Application, Aug. 13, 2013.

* cited by examiner

BREWING APPARATUS AND METHOD

FIELD OF THE INVENTION

The invention relates to the field of brewing, and in particular testing for end of fermentation of a brew. For convenience, the present invention will be described with particular reference to brewing beer, but it may be used to test for end of fermentation in other brews.

BACKGROUND OF THE INVENTION

Fermentation is a step in the beer brewing process, which starts when yeast is added to wort in a container. During fermentation, sugars are metabolised into alcohol and carbon dioxide. As the sugar is metabolised, fermentation gradually slows down until the "end of fermentation", when the beer is ready for further treatment such as conditioning, filtering or bottling. For home brewers, beer is bottled directly after fermentation has ended, for secondary fermentation and storage.

Fermentation typically takes between 4 and 7 days to complete, but this can vary depending on many factors, such as the temperature at which the fermenting wort is kept, the type of brew or the amount of yeast. However, it is important to accurately determine when fermentation has ended. As carbon dioxide gas is produced during fermentation, if the beer is bottled too early, this can result in a build up of pressure and eventually bottles may explode. On the other hand, if left to ferment for too long, the brew may spoil.

End of fermentation is currently determined when the specific gravity (SG) becomes stable over 24 hours (or reaches final gravity (FG)). The brewer will check for FG once it appears that carbon dioxide production has ceased. However, this method does raise some difficulties, because it requires efficient sealing at the measurement point, and the measurements can vary with temperature. Therefore, this method of measuring end of fermentation is not particularly suitable for automation. Furthermore, it generally requires contact with the wort, which is undesirable and can result in contamination if not performed correctly.

Accordingly, there is a need for alternative methods of testing for end of fermentation.

SUMMARY OF THE INVENTION

In a first aspect of the present invention, there is accordingly provided a method for testing for end of fermentation of a fermenting brew, by:
measuring a temperature difference between the temperature at a first height of the brew and the temperature at a second height of the brew; and
identifying end of fermentation if the temperature difference is greater than a threshold difference.

In a second aspect of the present invention, there is provided apparatus for testing for end of fermentation of a fermenting brew in a container, comprising:
a first temperature sensor positioned at a first height of the container;
a second temperature sensor positioned at a second height of the container;
means to measure a temperature difference between the temperature sensed by the first temperature sensor and the temperature sensed by the second temperature sensor; and
an indicator to indicate when the temperature difference is greater than a threshold difference, thereby indicating end of fermentation of the fermenting brew.

In a third aspect of the present invention, there is provided brewing apparatus, comprising:
a container for containing a fermenting brew;
a first temperature sensor positioned at a first height of the container;
a second temperature sensor positioned at a second height of the container;
means to measure a temperature difference between the temperature sensed by the first temperature sensor and the temperature sensed by the second temperature sensor; and
an indicator to indicate when the temperature difference is greater than a threshold difference, thereby indicating end of fermentation of the fermenting brew.

Preferably, the brewing apparatus also includes insulation to insulate the temperature sensors from external temperatures.

In further aspects of the present invention, a computer readable medium and computer program element for directing a programmable device to perform the steps of the above method are also provided.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention encompasses numerous alternatives, modifications and equivalents. For the purpose of example, numerous specific details are set forth in the following description in order to provide a thorough understanding of the present invention. The present invention may be practiced without some or all of these specific details.

For the purpose of clarity, technical material that is known in the technical fields related to the invention has not been described in detail so that the present invention is not unnecessarily obscured.

BRIEF DESCRIPTION OF THE DRAWINGS

An illustrative embodiment of the present invention will be discussed with reference to the accompanying drawings wherein.

DETAILED DESCRIPTION

The temperature of a brew in a fermenter is not uniform, but takes on distributions that are affected by wall heat transfer, the release of gas bubbles and biological heat release. The most profound temperature differences occur in the vertical direction.

While fermentation is active, both heat and carbon dioxide are generated throughout the liquid. Under stable ambient conditions there is an export of heat through the container walls and a small, uniform temperature gradient is set up. Practically, the differential temperature varies considerably, but it is typically under 100 mK.

When fermentation activity ceases, there is a surprising tendency for temperature to stratify in horizontal layers whenever there is heat flow to or from the surroundings, provided that the container is not disturbed or mixed. Depending on the rate of heat transfer, it is common to measure temperature differences of 300 to 600 mK—several times the differences when the vessel is "stirred" by fermentation activity. This provides a method of detecting end of fermentation.

In simple terms, fermentation activity suppresses the normal tendency of the vessel to stratify, and when fermentation slows down or stops, stratification will develop and can be detected electronically.

Accordingly, the present invention tests for end of fermentation by measuring a temperature difference between different heights of the brew (e.g temperature differentials on the outside of the container wall).

Figure 1:
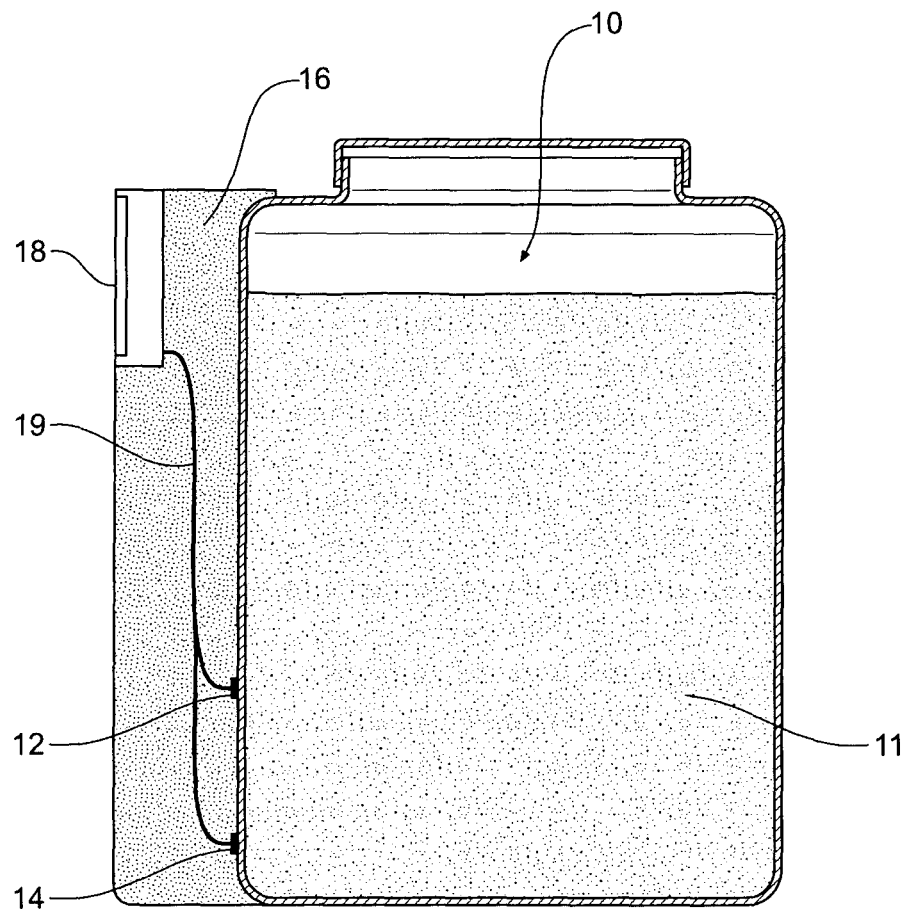
FIG. 1 shows in cross-section brewing apparatus for brewing beer, according to an embodiment of the present invention.

Referring now to FIG. 1, a container 10 is shown for containing a fermenting brew 11. In order to measure the temperature difference between different heights of the brew, two temperature sensors 12, 14 are located on the outside of the container wall. The first temperature sensor 12 is located above the second temperature sensor 14, by a height difference typically in the range of 50 mm to 200 mm and, in some embodiments, about 100 mm. The temperature sensors 12, 14 are insulated from the ambient air by insulating material 16 in order to reduce the influence of ambient temperature on the measurements of the temperature sensors 12, 14. A signal from the temperature sensors 12, 14 is sent to a user interface module 18 by means of wiring 19. The apparatus may optionally also include a temperature control means (not shown) to allow for some degree of heating or cooling of the brew.

Figure 2:
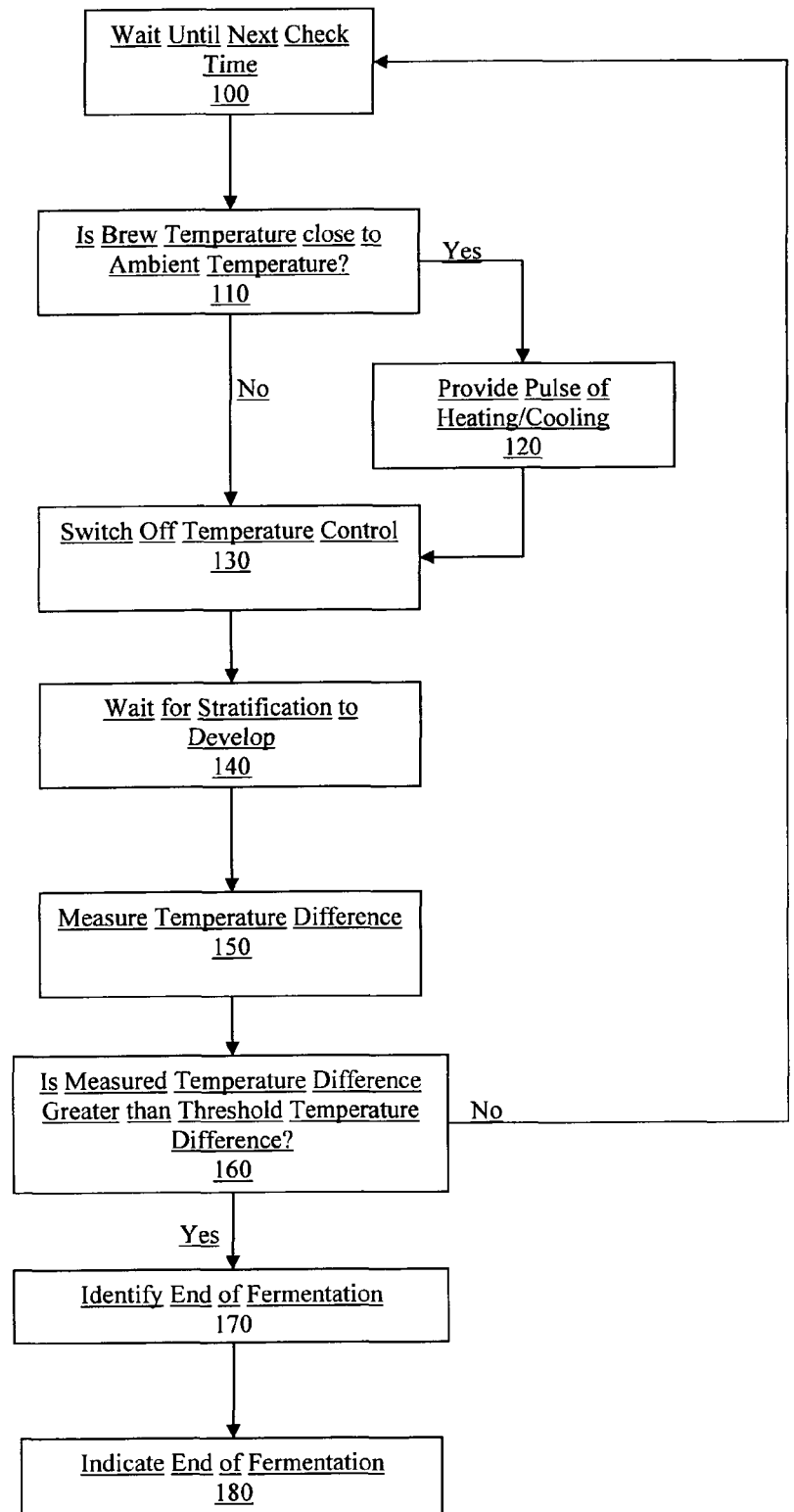
FIG. 2 is a flow diagram of a method according to an embodiment of the present invention.

FIG. 2 shows the steps of a method according to an embodiment of the present invention. The method may be run once per day, and may not be run at all for several days after fermentation starts—end of fermentation is not likely to occur within the first three or four days, and any identification within this time frame will probably be unreliable. In any event, the method can be run at regular intervals (e.g. daily). This embodiment of the invention is described on the assumption that the brew temperature is being controlled in some way by a temperature control means, but this will not necessarily be the case in all embodiments.

Accordingly, after waiting 100 until it is time to test for end of fermentation, the brew temperature is compared 110 to the ambient temperature. It is currently believed that in order for stratification to develop, there must be gentle heat flow either in or out of the vessel. In practice, ambient temperature will usually vary sufficiently over time to avoid this difficulty, or alternatively a temperature control system could be used to keep the vessel at a different temperature to the ambient temperature. However, if the vessel is kept at a constant room temperature, stratification may not occur, and the present invention may not identify end of fermentation as reliably as might be desired. Therefore, if the ambient temperature is close to the brew temperature (e.g. within 3 K), a technique referred to herein as "active probing" is used in this embodiment to create heat flow, and accordingly create stratification if fermentation has finished.

For active probing, a pulse 120 of temperature control is applied to the brew. This may be a heating or a cooling pulse, depending on the particular circumstances, and its duration may vary depending on the strength of the pulse. 15 minute heating pulses and 1 hour cooling pulses have been used successfully by the applicant.

Then, the temperature control pulse is switched off 130, and a wait 140 is required to allow stratification to develop if end of fermentation has occurred, for example waiting for about 2 hours. After this, the temperature difference between the two sensors may be measured 150, and compared 160 to a threshold difference to identify 170 whether end of fermentation has occurred.

However, active probing is not required where the brew temperature is different from the ambient temperature. In these cases, the measurement of the temperature differences may simply be conducted in a "passive probing" manner. Accordingly, the temperature control can simply be switched off 130, and after a wait (e.g. of about 3 hours—the time may vary between active and passive probing), the temperature difference between the two sensors can be measured 150 and compared 160 as described above, to identify 170 end of fermentation.

Of course, in some cases, end of fermentation could be identified 170 using passive probing without the need to even switch off the temperature control system 130. However, use of a temperature control system will often affect the stratification of the brew, by affecting the heat flow in or out of the vessel—in strong heating or cooling situations, the wall heat flow may become sufficiently large to disturb the biological heat release pattern (and may prevent stratification, or cause early development of stratification that is unrelated to fermentation activity). Therefore, it is convenient to switch the temperature control means off 130 and wait 140 before measuring the temperature difference.

Once end of fermentation is identified 170, this can be indicated 180 to a user. However, to be more confident in the detection, it may be desirable to wait until two or more successive identifications 170 have occurred before indicating 180 end of fermentation.

The primary function of the user interface module 18 in FIG. 1 would generally be to indicate end of fermentation 180. Accordingly, a very simple user interface module could simply consist of an LED which flashes to indicate end of fermentation.

However, a more complex user interface module 18 would comprise a processor and input/output devices, and would provide additional functionality. This could allow a user to provide more information about the brew, which in turn could be used to determine the threshold temperature difference by which end of fermentation is identified 170.

The additional user-supplied information may include the time at which the brew started (e.g. by a button press at the start of fermentation, when yeast is added), the volume of the brew, the temperature at which the brew should be kept (if a temperature control system is present), or details of the type of brew. These could be used to set the threshold temperature difference used to identify end of fermentation.

The threshold temperature difference may be an absolute temperature difference (e.g. 300 mK) that remains constant regardless of any other factors. However, more complicated algorithms may also be applied to determine a suitable threshold. For instance, fermentation takes several days to complete, for most brews. Therefore, if the threshold difference is exceeded before the first day has elapsed, this suggests that the measured temperature difference is not reliable. Accordingly, as described above, the system may wait until several days have occurred before even testing for end of fermentation. Alternatively, the threshold difference may be set very high until a minimum number of days (e.g. 3 or 4) have elapsed. However, the longer the brew has been fermenting, the more likely fermentation is to have finished. Therefore, the threshold difference may gradually be adjusted downwards as time elapses.

Accordingly, the threshold difference may be calculated according to the formula:

$$TD = A - B * t$$

where TD is the threshold difference,
A and B are constants, and
t is the time in days since fermentation began.

In practice, testing has not occurred until 4 days have elapsed, values of A=900 mK and B=0 mK have been used until up to 6 days have elapsed (i.e. constant threshold difference of 900 mK), and A=750 mK and B=50 mK have been used after 6 days have elapsed.

The overall temperature of the brew may also be monitored. This may be used to adjust the threshold temperature difference, because higher temperatures increase the rate of fermentation.

The present invention has the advantage of being non-contact with the brew, automatic and robust.

It should be noted that, in this embodiment, the sensors 12, 14 are positioned towards the bottom of the container. Whilst not essential, this arrangement allows for end of fermentation to be detected even when the container is not full (i.e. where there is only a small brew).

Although an embodiment of the present invention has been described in the foregoing detailed description, it will be understood that the invention is not limited to the embodiment disclosed, but is capable of numerous rearrangements, modifications and substitutions without departing from the scope of the invention. Modifications and variations such as would be apparent to a skilled addressee are deemed within the scope of the present invention.

For example, whilst the container represented in FIG. 1 is representative of a 23 liter container commonly used by home brewers, different sizes and shapes of containers may obviously be used. Similarly, many different types of temperature sensors may also be used, depending on considerations such as the required accuracy of temperature measurement, and the associated cost of the sensors.

For a high degree of accuracy, sensors 12, 14 may be thermistors. On the other hand, in other embodiments, the sensors 12, 14 may be thermopiles—a thermopile is constructed by connecting thermocouple junctions in series; alternate junctions are located at the positions between which the differential temperature is required. Thus, each pair of junctions contributes a small voltage to the series circuit. For the system shown in FIG. 1, a 20-junction T-type thermocouple might be connected to a high gain amplifier (a single stage operational amplifier with a gain of 12000) and provided sufficient resolution for the purposes of the present invention. However, many variations would obviously be possible—for instance, it may be better practice to use two amplification stages.

The temperature sensors 12, 14 may be configured in differential mode, so that changes in the bulk temperature cancel out, and the signal from the sensors would then be proportional to the temperature difference between the two heights.

The temperature control means may allow for full automatic control of the brew temperature (e.g. setting it to a specific temperature), or it may simply provide a constant cooling (or heating) effect on the brew.

The adjustment of the threshold difference over time, as described above, may be partially or fully performed by either hardware or software.

This list of options should not be considered exhaustive, and indeed the active probing technique may be applied even where the brew temperature is not close to the ambient temperature.

It should be also appreciated that the present invention can be implemented in numerous ways, including as a process, apparatus, or a computer readable medium.

As previously stated, the present invention is not limited in its application to beers—it may be used to test for end of fermentation in wines and other fermenting brews.

More than two sensors may be used in accordance with the invention, and the temperature may be measured at more than two heights, if a more detailed picture of the brew stratification is desired.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge.

The invention claimed is:

1. A method for testing for the end of fermentation of a fermenting brew, wherein the fermenting brew is in a home brewing container, by:
   measuring a temperature difference between the temperature at a first height of the brew and a temperature at a second height of the brew;
   identifying end of fermentation if the temperature difference is greater than a threshold difference; and
   providing an indicator to indicate the end of fermentation.

2. The method as claimed in claim 1, wherein multiple identifications of the end of fermentation are required before end of fermentation is indicated.

3. The method as claimed in claim 1, wherein the temperature measurements are performed at the container wall, and the first height and the second height differ by between 50 mm and 200 mm.

4. The method as claimed in claim 1, wherein the temperature measurements are performed at the container wall, and the first height and the second height differ by about 100 mm.

5. The method as claimed in claim 1, wherein the temperature measurements are performed at the container wall, and the threshold difference is 900 mK.

6. A method, as claimed in claim 1, wherein the brew is beer.

7. The method as claimed in claim 1, wherein the temperature difference, which is greater than the threshold difference, indicates the development of stratification in the brew.

8. The method as claimed in claim 1, wherein the temperature measurements are obtained using sensors located on the outside of a wall of the home brewing container.

9. The method as claimed claim 1, wherein the threshold difference is calculated according to the formula:

$$TD=A-B*t,$$

where TD is the threshold difference,
A and B are constants, and
t is the time since fermentation began.

10. The method as claimed in claim 9, wherein:
A=750 mK
B=50 mK, and
t is the time in days.

11. The method as claimed in claim 1, further comprising, prior to measuring a temperature difference, both switching off a temperature controller that controls the emperature of the brew and waiting for stratification to occur, wherein the fermenting brew is not removed from the home brewing container while waiting for the stratification to occur after switching off the temperature controller.

12. The method as claimed claim 11, further comprising applying a pulse of temperature control to the fermenting brew in the home brewing container prior to switching off the temperature controller.

13. The method as claimed in claim 12, wherein the pulse is a heating pulse.

14. The method as claimed in claim 12, wherein the pulse is a cooling pulse.

15. A computer readable medium for directing a programmable device to perform the method of claim 1.

16. An Apparatus for testing for the end of fermentation of a fermenting brew in a home brewing container, comprising:
   a first temperature sensor positioned at a first height of the home brewing container;
   a second temperature sensor positioned at a second height of the home brewing container;
   a measure that measures a temperature difference between a temperature sensed by the first temperature sensor and a temperature sensed by the second temperature sensor; and
   an indicator to indicate when the temperature difference is greater than a threshold difference, thereby indicating the end of fermentation of the fermenting brew.

17. The apparatus as claimed in claim 16, further comprising:
   a temperature controller to control the temperature of the brew.

18. The apparatus as claimed in claim 16, further comprising:
   insulation to insulate the first and second sensors from ambient temperature.

19. The apparatus as claimed in claim 16, wherein the first height and the second height are both towards the bottom of the container such that the sensors positioned at these heights can measure a temperature of the brew, even when the container is not full.

20. The apparatus as claimed in claim 16, wherein the temperature difference measured by the measurer indicates the development of stratification in the brew.

21. The apparatus as claimed in claim 16, wherein the first temperature sensor and the second temperature are positioned on the outside of a wall of the home brewing container.

22. A brewing apparatus, comprising:
   a home brewing container for containing a fermenting brew;
   a first temperature sensor positioned at a first height of the home brewing container;
   a second temperature sensor positioned at a second height of the home brewing container;
   a measure that measures a temperature difference between the temperature sensed by the first temperature sensor and a temperature sensed by the second temperature sensor; and
   an indicator to indicate when the temperature difference is greater than a threshold difference, thereby indicating end of fermentation of the fermenting brew.

23. The brewing apparatus as claimed in claim 22, further comprising:
   a temperature controller means to control the temperature of the brew.

24. The brewing apparatus as claimed in claim 22, further comprising:
   insulation to insulate the first and second sensors from ambient temperature.

25. The brewing apparatus as claimed in claim 22, wherein the first height and the second height are both towards the bottom of the container such that the sensors positioned at these heights can measure a temperature of the brew, even when the container is not full.

26. The brewing apparatus as claimed in claim 22, wherein the temperature difference measured by the measurer indicates the development of stratification in the brew.

27. The brewing apparatus as claimed in claim 22, wherein the first temperature sensor and the second temperature sensor are positioned on the outside of a wall of the home brewing container.

28. A method for determining the end of fermentation of a fermenting brew in a home brewing container, the method comprising:
   identifying the end of fermentation upon a temperature difference between a temperature at a first height of the brew and a temperature at a second height of the brew exceeding a threshold difference; and
   providing an indicator to indicate the end of fermentation.

* * * * *